(12) United States Patent
Chew et al.

(10) Patent No.: US 6,563,676 B1
(45) Date of Patent: May 13, 2003

(54) DISK DRIVE ACTUATOR ARM

(75) Inventors: David W. Chew, San Jose, CA (US); Pantelis S. Alexopoulos, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/672,515

(22) Filed: Sep. 27, 2000

Related U.S. Application Data
(60) Provisional application No. 60/156,427, filed on Sep. 28, 1999.

(51) Int. Cl.[7] .................................................. G11B 5/55
(52) U.S. Cl. ............................... 360/264.7; 360/265.7; 360/266.3
(58) Field of Search ............................. 360/264.7, 250, 360/254.6, 255, 260, 264.1, 264.2, 265.9, 266, 244.2, 244.3, 265.7, 266.3, 245.9

(56) References Cited

U.S. PATENT DOCUMENTS

| | | | | |
|---|---|---|---|---|
| 4,620,252 A | * | 10/1986 | Bauck et al. | .................. 310/36 |
| 4,996,623 A | * | 2/1991 | Erpelding et al. | ........ 360/244.3 |
| 5,526,208 A | * | 6/1996 | Hatch et al. | .............. 360/245.8 |
| 5,539,596 A | * | 7/1996 | Fontana et al. | .............. 360/126 |
| 5,606,477 A | * | 2/1997 | Erpelding et al. | ........ 360/244.3 |
| 5,781,380 A | * | 7/1998 | Berding et al. | ........... 360/244.5 |
| 5,862,015 A | * | 1/1999 | Evans | ....................... 360/244.1 |
| 5,953,183 A | * | 9/1999 | Butler et al. | .............. 360/264.2 |
| 5,970,602 A | * | 10/1999 | Harada et al. | ............ 29/603.06 |
| 5,986,853 A | * | 11/1999 | Simmons et al. | ......... 360/245.9 |
| 6,215,622 B1 | * | 4/2001 | Ruiz et al. | ................ 360/244.3 |
| 6,310,746 B1 | * | 10/2001 | Hawwa et al. | ............ 360/244.2 |
| 6,351,348 B1 | * | 2/2002 | Erpelding et al. | ........ 360/244.3 |

\* cited by examiner

*Primary Examiner*—David Hudspeth
*Assistant Examiner*—Angel Castro
(74) *Attorney, Agent, or Firm*—Sheridan Ross P.C.

(57) ABSTRACT

An actuator arm for a disk drive includes a flat sheet of material having a predetermined configuration. This arm lies pivotally mounted to a base of the disk drive; and it supports a coil assembly and cable segments as well as other components such as a pre-amp and a damper. The method of making this actuator arm includes the steps of cutting a flat sheet of material to a predetermined configuration and then securing the various components to it.

20 Claims, 2 Drawing Sheets

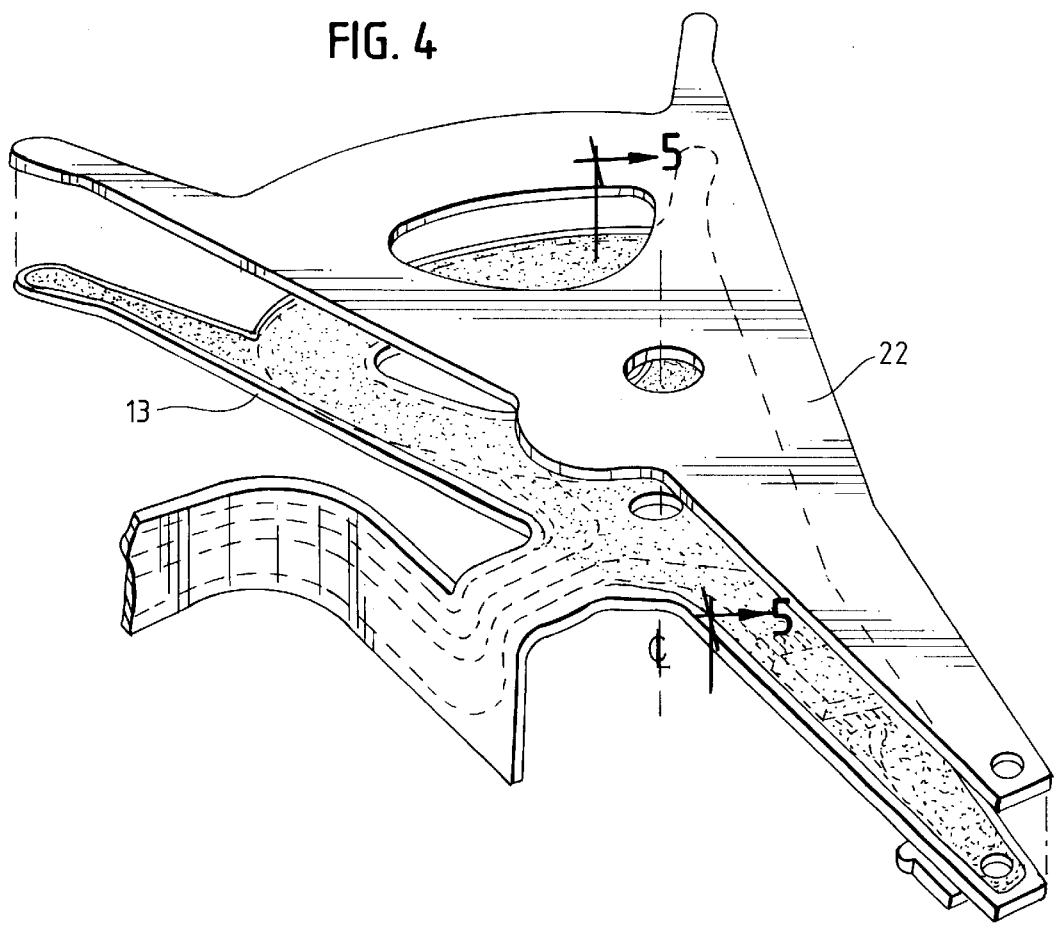
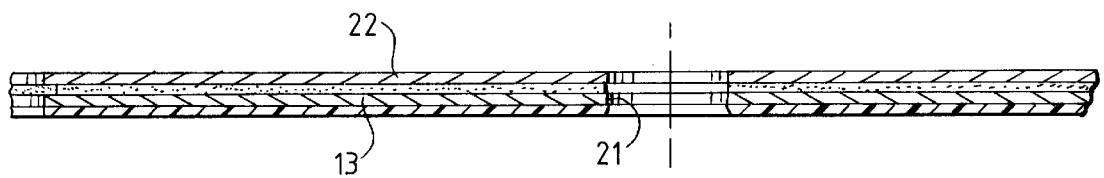

DISK DRIVE ACTUATOR ARM

RELATED APPLICATIONS

The present application claims priority under 35 U.S.C. § 119(e) from U.S. Provisional Patent Application Ser. No. 60/156,427, filed Sep. 28, 1999, which provisional application is incorporated herein by reference in its entirety.

FIELD OF THE INVENTION

The present invention relates to disk drives for the mass storage of information in computer systems, and more particularly to a disk drive actuator arm that has a simple, planar construction especially suitable for single disk systems but also suitable in multi-disk systems.

DESCRIPTION OF THE PRIOR ART

Most disk drive storage systems include a plurality of disks stacked onto a rotatable spindle and a corresponding number of magnetic heads that read binary digital information from the disks and write such information on them. The magnetic heads lie mounted on slides that an actuator arm suspends over the surfaces of the disks while the actuator arm lies rotatably mounted to a base member of the disk drive.

The actuator arm constructions used in these systems are complex arrangements suited for use with a stacked arrangements of disks. Their complexity makes them expensive to fabricate and assemble; and it renders them susceptible to malfunction.

The actuator arm of the present invention avoids the disadvantages of these prior devices. It is a simple construction that minimizes the expense of fabrication and assembly while providing consistent and precise performance. It is especially suited for use in single disk systems. This construction allows easy mounting of a voice coil, preamplifier, and flex cable; and it allows miniaturization of the disk drive in which it operates.

SUMMARY OF THE INVENTION

An actuator arm for a disk drive includes a flat sheet of material having a predetermined configuration. This arm lies pivotally mounted to a base of the disk drive; and it supports a coil assembly and flex cable as well as other components such as a pre-amp. The arm may also include a second sheet secured to the first sheet. This second sheet may have the same or similar configuration as that of the first sheet. In place it dampens and minimizes vibrations in the actuator arm. The method of making this actuator arm includes the steps of cutting a flat sheet of material to a predetermined configuration and then securing the various components to it. As can be appreciated, the simplicity of the present actuator structure and the method of manufacturing it allows it to be made virtually any size and length. In turn, this advantageously allows the present actuator to be used in a disk drive of almost any form factor.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 4 is an exploded perspective view of the actuator arm of the present invention; and FIG. 5 is a section view along line 5—5 in FIG. 4.

While the following disclosure describes the invention in connection with one embodiment, one should understand that the invention is not limited to this embodiment. Furthermore, one should understand that the drawings are not to scale and that graphic embodiment. In certain instances, the disclosure may not include details which are not necessary for an understanding of the present invention such as conventional details of fabrication and assembly.

DETAILED DESCRIPTION OF THE PREFERRED EMBODIMENT

Figure 1:
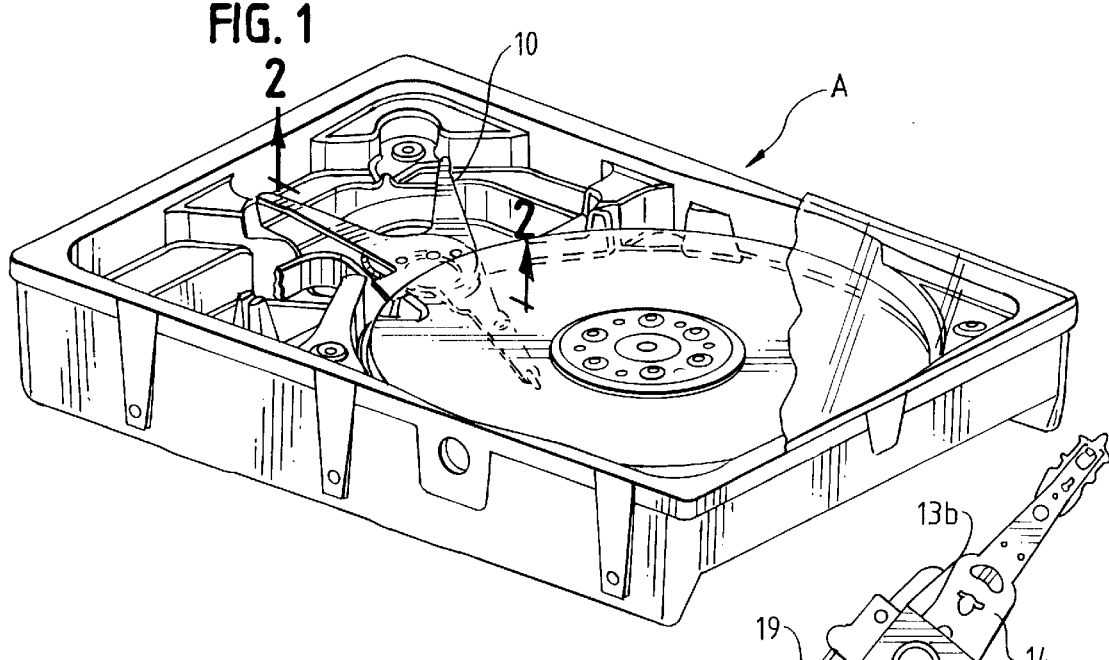
FIG. 1 is a partial perspective view of a disk drive that includes an actuator arm of the present invention.
Figure 2:
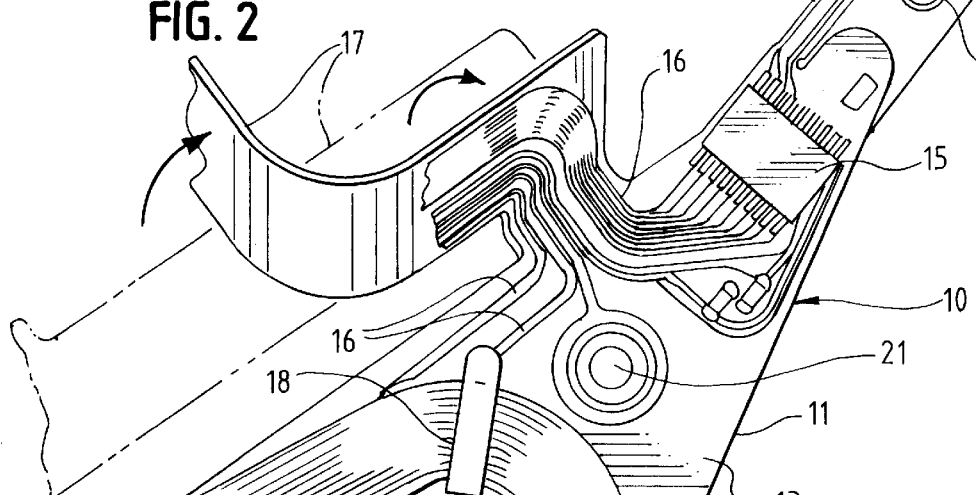
FIG. 2 is a plan view of the actuator arm of the present invention taken along line 2—2 in FIG. 1.

Turning now to the drawings and referring specifically to FIGS. 1 and 2, a disk drive apparatus A includes an actuator 10 with an arm 11 which supports a voice coil 12 and a pivot assembly (not shown) which pivotally connects the actuator 10 to a base B of the apparatus A. Permanent magnets (not shown) disposed on the base B provide a magnetic field that interacts with the magnetic field provided by the voice coil assembly 12 to drive the actuator to various positions over a disk D of the disk drive apparatus A.

The actuator arm 11 of the present invention is a planar structure suited for use in a single disk system. However, this arm 11 may alternatively operate in other constructions, including those used in multi-disk systems. The arm 11 includes a first sheet or layer 13 made of aluminum, non-magnetic steel, or any other non-magnetic material of high strength and rigidity. In addition to the voice coil 12, this layer 13 supports a flexure 14 (which includes the actuator's magnetic heads), a preamplifier 15 and a flex cable 16 that electrically connects these components together.

The voice coil 12 lies at the back end of the sheet 13 around an opening 13a. It is a flat laminate structure with a bottom, electrically insulating layer (e,g., polymide), a middle, electrically conductive layer (e,g., copper), and a top, electrically insulating layer (e,g., polymide). One method of forming the middle conductive layer (which defines a single spiraling trace) is to remove portions of a sheet of conductive metal (copper) as with photo-etching techniques. In this way, the voice coil 12 can be formed as part of the flex cable 16. Laminating adhesive secures one layer to another and the bottom layer to the first sheet 13. Alternatively, the coil 12 may be fabricated by winding wire around a mandrel, (not shown) and bonding this coil to the actuator arm 11 and terminating the coil wires to the flex cable 16.

Figure 3:
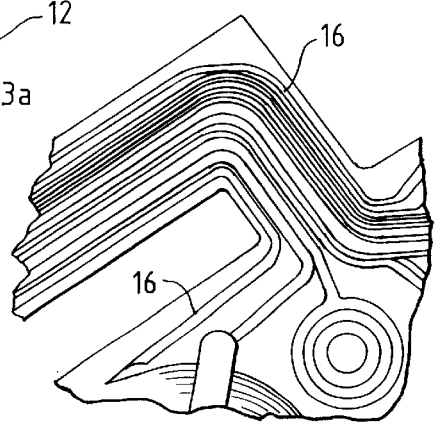
FIG. 3 is a partial plan view of the flex cable and flex cable bracket of the present invention.

The flex cable 16 has the same laminate structure, including top and bottom insulating layers and a middle conductive layer. They lie on the first sheet 13, secured to it with adhesive, in the positions shown in FIG. 2. They also extend onto an extension 17 of the first sheet 13, an extension which serves as a flex cable bracket as shown in FIG. 3. The sheet 13 and the extension 17 are a one-piece, integrally formed unit, although the extension may also be formed as a separate piece to support the flex cable. In its final position, the extension 17 extends perpendicularly of the sheet 13, curving outwardly of the sheet 13. (An overlapping appendage 18 connects one end of the coil 12 to one segment of the cable 16.)

The preamplifier 15 lies proximate the front end of the sheet 13 secured (as with conventional solder reflow techniques) a predetermined distance from the front end 13b.

In the space between the preamplifier 15 and the front end 13b, the sheet supports a head interconnect 19 integrated into the flex cable. The proximity of the pre-amp to the recording head, provided by this construction, minimizes the electrical circuit length, thereby greatly improving electrical performance of the recording channel. An opening 21 through the middle portion of the sheet 13 allows a screw (not shown) to pass through the arm 11 and secure the arm to a pivot assembly (not shown). The electrical circuit length can be further minimized and noise further reduced by alternatively placing the preamplifier 15 on the flexure 14, rather than proximate the front end 13b of the actuator. For example, a silicon chip or bare die in flip chip form may be attached directly to the flexure electrical connection system.

The actuator arm 11 may also include a second sheet 22 which has the same or similar configuration as the first sheet 13 as shown in FIGS. 4 and 5. It serves as a damper to minimize vibrations in the actuator arm 11. It lies in face-to-face relation with the first sheet 13 secured with a visco-elastic adhesive or other similar securing means to the sheet 13. It may lie in face-to-face relation with the face of the sheet 13 opposite the face that receives the voice coil 12, the preamplifier 15, and the flex cable segments 16, or vice versa.

The actuator of the present invention is also well suited for use in a dual stage environment. In such a configuration, a conventional voice coil motor would be used to move the head assembly from track to track, while a micro-actuator, such as a piezoelectric element, would be used for track following purposes. The micro-actuator can be positioned on the suspension or on the slider. Any of these alternative embodiments will allow for small adjustments of the head assembly relative to the disk surface.

The actuator of the present invention is further suited for use with active damping techniques. For example, a strain gauge or similar sensor can be designed directly into the flex cable 16. The embodiment might include "zig-zag" shaped traces formed in the flex cable which would sense vibration or bending of the actuator through a change in resistance. While this problem is greater at the inside and outside diameters of the disk, upon sensing a vibration or bending mode, the servo system can be utilized to compensate for any misalignment of the head relative to the disk surface.

The method of making the actuator arm 11 includes taking a thin, flat sheet of material 13 and cutting (as by stamping) the sheet into a predetermined shape, including an extension 17. The method then comprises the steps of securing the various components (voice coil 12, flexure 14, flex cable 16, preamplifier 15 and damper 22) to the exposed face of the sheet 13, forming the opening 21 and bending the extension 17 from the flat shape shown in phantom lines in FIG. 2 to the final shape shown in solid lines in that figure.

While the above description and the drawings disclose and illustrate one embodiment, one should understand, of course, that the invention is not limited to this embodiment. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. An actuator assembly for a disk drive, said assembly comprising:
    an actuator arm including a first sheet of metallic material having a predetermined length, said first sheet being thin and flat and having first and second faces, and a second sheet of metallic material being thin and flat and secured to the first sheet in face-to-face relation at said second face; and
    a plurality of components secured to said first face of said first sheet, said components including a flat coil, wherein no components are mounted on said second sheet.

2. The actuator assembly of claim 1, wherein the first and second sheets are secured together with a visco-elastic adhesive.

3. The actuator assembly of claim 2, wherein the first and second sheets are substantially co-extensive.

4. The actuator assembly of claim 1, further comprising an extension secured to the first sheet, said extension being thin and flat.

5. The actuator assembly of claim 4, wherein the extension and the first sheet are a one-piece, integrally formed unit.

6. The actuator assembly of claim 1, further comprising a flex cable secured to the first sheet on the first face to which the flat coil is secured.

7. The actuator assembly of claim 6, further comprising a sensor formed in said flex cable.

8. The actuator assembly of claim 7, wherein said sensor detects bending of or vibration in said actuator arm.

9. The actuator assembly of claim 6, further comprising a preamplifier connected to said flex cable and disposed on said actuator arm.

10. The actuator assembly of claim 1, further comprising a flat cable secured to the first sheet.

11. The actuator assembly of claim 1, wherein the first sheet is substantially non-ferromagnetic.

12. The actuator assembly of claim 1, wherein the second sheet is substantially non-ferromagnetic.

13. The actuator assembly of claim 1, wherein the first sheet has a midsection that defines an opening for pivotally securing the arm to a base of the disk drive.

14. The actuator assembly of claim 1, wherein said flat coil is a wound wire coil.

15. An actuator assembly for a disk drive comprising:
    an actuator arm including:
    a sheet of homogeneous material having a flat configuration;
    an adhesive layer attached to a second opposite side of said sheet; and
    means for dampening the actuator arm attached to the second side of said sheet of material by said adhesive layer, said dampening means being in the form of a plate having a flat configuration and being made of a homogeneous material and extending substantially coextensive with said sheet of material; and
    a voice coil having a flat configuration attached to a first side of said sheet.

16. An actuator assembly, as claimed in claim 15, wherein:
    said adhesive layer is a visco-elastic adhesive.

17. An actuator assembly, as claimed in claim 15, further comprising:
    an extension secured to said sheet of material, said extension being of a flat configuration.

18. An actuator assembly, as claimed in claim 15, wherein:
    said sheet of material is substantially non-ferromagnetic.

19. An actuator assembly, as claimed in claim 15, wherein:

said dampening means is substantially non-ferromagnetic.

20. An actuator assembly for a disk drive comprising:

an actuator arm including:
   a sheet of metallic material having a flat configuration and first and second sides; and
   means for dampening the actuator arm attached to said second side of said sheet of material, said dampening means having a flat configuration and being made of a metallic material and having an exposed surface without components mounted thereon; and a plurality of components mounted on said first side of said sheet, said components including a voice coil and a flex cable.

* * * * *